United States Patent
Leesakul et al.

(10) Patent No.: US 12,470,392 B2
(45) Date of Patent: Nov. 11, 2025

(54) METHOD FOR SECURE PRIVACY-PRESERVING DEVICE-FREE BIOMETRIC SIGNING WITH MULTI-PARTY COMPUTATION AND CANCELABLE BIOMETRIC TEMPLATE

(71) Applicant: Finema Company Limited, Bangkok (TH)

(72) Inventors: Pakorn Leesakul, Bangkok (TH); Wutichai Chongchitmate, Bangkok (TH); Rachata Tosirisuk, Bangkok (TH); Sammotic Switchyarn, Bangkok (TH); Nuttawut Kongsuwan, Bangkok (TH); Sarawuth Rungcharoenkit, Samut Prakan (TH)

(73) Assignee: Finema Company Limited, Bangkok (TH)

( * ) Notice: Subject to any disclaimer, the term of this patent is extended or adjusted under 35 U.S.C. 154(b) by 0 days.

(21) Appl. No.: 18/017,673

(22) PCT Filed: Aug. 8, 2022

(86) PCT No.: PCT/TH2022/000030
§ 371 (c)(1),
(2) Date: Jan. 24, 2023

(87) PCT Pub. No.: WO2024/035348
PCT Pub. Date: Feb. 15, 2024

(65) Prior Publication Data
US 2024/0259204 A1 Aug. 1, 2024

(51) Int. Cl.
*H04L 29/00* (2006.01)
*G06V 40/50* (2022.01)
(Continued)

(52) U.S. Cl.
CPC ............ *H04L 9/3231* (2013.01); *G06V 40/53* (2022.01); *H04L 9/085* (2013.01); *H04L 9/3247* (2013.01)

(58) Field of Classification Search
CPC ..... H04L 9/3231; H04L 9/085; H04L 9/3247; H04L 9/0866; G06V 40/53; G06F 21/6245; G06F 21/32
See application file for complete search history.

(56) References Cited

U.S. PATENT DOCUMENTS 7,631,193 B1 * 12/2009 Hoffman ............... H04L 9/3231
726/4
8,700,909 B2 * 4/2014 Griffin .................. H04L 9/3247
713/185
(Continued)

OTHER PUBLICATIONS

Maiorana et al., "Cancelable Templates for Sequence-Based Biometrics with Application to On-line Signature Recognition", IEEE Transactions on Systems, Man, and Cybernetics—Part A: Systems and Humans, vol. 40, No. 3, May 2010.
(Continued)

*Primary Examiner* — Don G Zhao
(74) *Attorney, Agent, or Firm* — Minder Law Group; Willy H. Wong

(57) ABSTRACT

The present invention provides a method for digitally signing an electronic message in a secure, privacy-preserving, and device-free manner by presenting a biometric probe to a computer terminal, where the biometric probe never leaves the terminal, and any data leaving the terminal cannot reveal the presented biometric characteristics. The user's biometric sample is converted into a cancelable biometric template (CBT) and initiates multi-party computation (MPC) with a set of computer servers to perform a key inception algorithm and distribute secret shares to the participating servers, as well as to generate relevant parameters. Once registered, the
(Continued)

user may present a biometric probe on another computer terminal and retrieve the account parameters using a privacy-preserving method. The account parameters are used with the biometric probe to produce a digital signature by performing MPC. Custodian servers may participate in this method to allow for alternative identification.

5 Claims, 5 Drawing Sheets

(51) Int. Cl.
H04L 9/08 (2006.01)
H04L 9/32 (2006.01)

(56) References Cited

U.S. PATENT DOCUMENTS

| | | | | |
|---|---|---|---|---|
| 8,924,729 | B1* | 12/2014 | Oakes, III | H04L 9/3231 713/176 |
| 9,596,088 | B1* | 3/2017 | Oakes, III | H04L 9/0866 |
| 9,866,393 | B1* | 1/2018 | Rush | H04L 9/3236 |
| 10,110,385 | B1* | 10/2018 | Rush | H04L 9/3234 |
| 10,142,333 | B1* | 11/2018 | Griffin | H04L 9/3231 |
| 10,277,400 | B1* | 4/2019 | Griffin | H04L 9/3231 |
| 11,070,378 | B1* | 7/2021 | Griffin | H04L 9/3247 |
| 11,190,355 | B2* | 11/2021 | Wang | H04L 9/3231 |
| 11,368,849 | B1* | 6/2022 | Reeves | H04W 12/67 |
| 11,436,597 | B1* | 9/2022 | Griffin | H04L 9/30 |
| 2003/0014372 | A1* | 1/2003 | Wheeler | H04L 9/3231 705/71 |
| 2004/0005051 | A1* | 1/2004 | Wheeler | H04L 9/3231 380/28 |
| 2009/0271634 | A1* | 10/2009 | Boult | H04L 9/0877 713/186 |
| 2010/0205660 | A1 | 8/2010 | Griffin | |
| 2011/0213981 | A1* | 9/2011 | Griffin | H04L 9/3231 713/172 |
| 2015/0095999 | A1* | 4/2015 | Toth | H04L 9/3263 726/6 |
| 2015/0347734 | A1 | 12/2015 | Beigi | |
| 2016/0171580 | A1* | 6/2016 | Waters | H04L 9/3231 705/26.5 |
| 2019/0356491 | A1* | 11/2019 | Herder, III | H04L 9/3242 |
| 2020/0028686 | A1 | 1/2020 | Karabina et al. | |
| 2020/0153824 | A1 | 5/2020 | Lewison et al. | |
| 2021/0182863 | A1* | 6/2021 | Doraiswamy | G06Q 20/02 |
| 2021/0209249 | A1 | 7/2021 | Hoffer | |
| 2021/0272098 | A1* | 9/2021 | Delsuc | G06Q 20/341 |
| 2021/0336792 | A1* | 10/2021 | Agrawal | H04L 9/30 |
| 2022/0321558 | A1* | 10/2022 | Slensker | G06F 21/44 |
| 2024/0121098 | A1* | 4/2024 | Herder, III | H04L 9/3255 |
| 2024/0259204 | A1* | 8/2024 | Leesakul | G06F 21/6245 |

OTHER PUBLICATIONS

International Search Report and Written Opinion of International Application No. PCT/TH2022/000030, mailed on & Dec. 2022.

* cited by examiner

METHOD FOR SECURE PRIVACY-PRESERVING DEVICE-FREE BIOMETRIC SIGNING WITH MULTI-PARTY COMPUTATION AND CANCELABLE BIOMETRIC TEMPLATE

RELATED APPLICATIONS

This application claims priority to PCT Patent Application No. PCT/TH2022/000030 filed Aug. 8, 2022.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of the Invention

The present invention relates to a method whereby a biometric sample is used to perform a digital signature algorithm using cryptographic operation-including multi-party computation, cancelable biometric template, and private information retrieval—to preserve security and privacy.

Description of the Related Art

A digital signature is a cryptographic scheme that provides authenticity and integrity to an electronic message. A digital signature can be used as a means to authenticate a person and provide gateways to online transactions and applications. Conventionally, generating digital signatures requires possession of secret cryptographic keys that must be stored in specialized or smart devices, such as smartphones, smart cards, and USB tokens. Unfortunately, this approach leaves out a significant proportion of the population who cannot use such devices due to, e.g., disability or lack of finance. Generating digital signatures from biometric samples could provide an alternative that addresses this issue, although it also introduces other challenges.

Firstly, each biometric reading always contains some randomness due to, for example, different ambient conditions and angles of which reading devices record the biometric samples. Secondly, unlike passwords, the biometric samples of a person cannot be easily changed. Once biometric information is compromised, it also increases the likelihood of identity theft. Thus, biometric information must be handled with care, either at rest or in transit. Even under encryption, biometric information is still not entirely safe since malicious actors could store encrypted biometric information for a long time until the encryption protocols become broken.

To address the inaccuracy in biometric readings, several error-tolerant procedures were introduced. The most direct method is to measure the difference between the stored biometric information and the read one. Then, the measurement passes if the difference is sufficiently small. There are more complicated methods other than difference measurement. For example, error-correcting codes allow different readings of biometric information to be decoded to the same codeword if they are sufficiently closed; bloom filters use probabilistic data structures to store different features of biometric information using irreversible hashing; fuzzy vaults allow any keys similar to the one used to encrypt to decrypt the vault.

To address the problem where underlying biometric information cannot be changed easily, cancelable biometrics techniques were invented to transform biometric information into a revocable and non-invertible way. Many techniques have been studied, such as random projections, bloom filters, fuzzy vaults, neural networks, and deep learning.

This leaves a vulnerability where leakage of the user's secret key can produce fraudulent digital signatures without legitimate users' consent. To eliminate such a single point of failure, secret sharing and secure multi-party computation (MPC) could be employed to allow two or more parties to jointly compute digital signatures while keeping their secret shares hidden from other parties, whereby neither party has the user's complete secret key.

Users may also not wish their signing activities to be monitored or tracked. A privacy-preserving mechanism must be employed to address this problem by allowing the user to query an entry in a database without revealing which entry has been queried. For example, a private information retrieval (PIR) protocol can be constructed using cryptographic primitives such as homomorphic encryptions or oblivious RAM (ORAM).

SUMMARY

The present invention provides a method that allows a user to digitally sign an electronic message with the biometric sample of their biometric characteristics—such as a fingerprint, an iris, or a face—in a secure and privacy-preserving manner without a need to remember a password or take possession of any device that stores cryptographic materials. The invention utilizes cryptographic operations, including secure multi-party computation (MPC), cancelable biometric template, and private information retrieval. The method involves at least two computing entities: a computer terminal that a user directly interacts with and one or more computer servers called a controller that registers and manages the user's account and facilitates the signing process. The processes may also involve an optional computing entity, called a custodian, that accepts alternative identification from the user in a case where the user is unable to provide matching biometrics and perform multi-party computation with the controller to recover the user's account.

The method composes multiple sub-processes, including registration, signing, biometric replacement, biometric re-binding processes. During registration, the user provides initial biometric information to the terminal to generate an account, a set of secret shares, and a public key with the controller and the custodian, if present. After registration, the user may present a matching biometric probe to another terminal to sign a message with the controller. The user may subsequently replace their biometric reference with the biometric replacement process or present alternative identification to the custodian to initiate the biometric re-binding process. In the processes, the user's biometric information never leaves the terminal, not even in an encrypted form, and the private key never appears in its full form in the memory of any participating computing entity.

BRIEF DESCRIPTION OF THE DRAWINGS

An exemplary embodiment of the invention is illustrated by way of example in the following schematic drawings.

The description taken with the drawings makes apparent to those skilled in the art how embodiments of the invention may be practiced.

DETAILED DESCRIPTION OF THE SPECIFIC EMBODIMENTS

Figure 1:
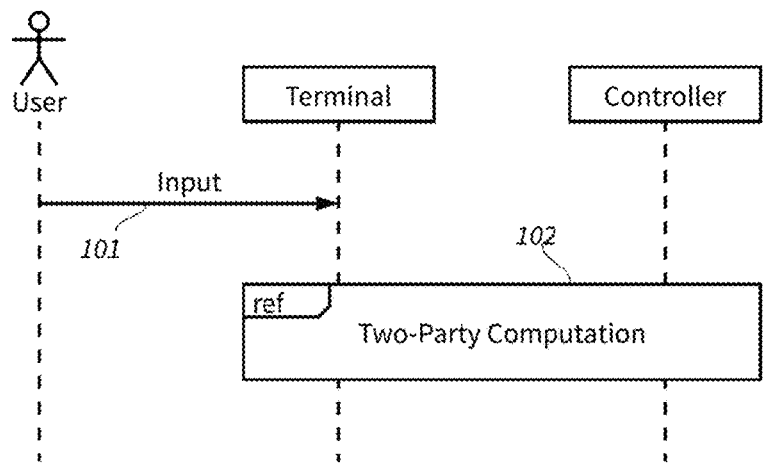
FIG. 1 is a sequence diagram illustrating the participation of a terminal—through which a user provides input—and a controller in a two-party computation protocol, according to an example embodiment.

The present invention discloses a method for secure, privacy-preserving, and device-free biometric signing that utilizes multi-party computation and cancelable biometric templates (CBT) for performing cryptographic operations. The invention allows users to use their biometric characteristics as a partial input to sign messages digitally. The user's biometric sample never leaves a computer terminal into which the sample is input, not even in an encrypted form. The information leaving the computer terminal also cannot be reversed, by any practical means, into the input biometrics. This guarantees that other parties in the system, including other terminals, cannot obtain and store the captured biometric sample. Secure multi-party computation (MPC) is utilized to ensure that the user's secret key does not appear at any time or store anywhere in the system, even during the registration or the message signing processes.

The invention involves two primary parties: a terminal where biometric capture occurs and a controller that facilitates the signing process. The method may also include an optional custodian whose role is to facilitate a recovery process in case a biometric sample associated with the biometric reference cannot be given.

A terminal is a digital device, such as a desktop computer, a smart device, or a kiosk, which can take a user's biometric information and digitally compute a CBT and associated account parameters. A computer terminal displays an instruction that prompts the user to perform the necessary action to sign an arbitrary message digitally. After each interaction, the digital device should remove any input biometric information as a precaution against cyberattacks.

A controller is a computing entity that facilitates the registration and signing processes, as well as performing the recovery and re-enrolment processes. The controller is a single server node or a group of nodes that are configured to act as a single entity.

A custodian is another computing entity whose role is to prove the identity of the user in case the user has lost a means to provide a biometric probe, for example, due to injuries or medical conditions. To prevent a single entity from taking over the user's account, the entity that controls the custodian should be different from the entity that controls the controller. Business or legal processes must also be established to prevent both entities from colluding with each other and performing signing without the legitimate user's consent. In the same manner, as the controller system, the custodian system could be a single server node or a group of server nodes that are configured to act as a single entity.

The invention has four prominent processes: registration (enrolment), signing, biometric replacement (re-enrolment with a new biometric sample of a biometric characteristic), and biometric re-binding (re-enrolment with a different biometric characteristic). Registration is the process that registers an applicant to the controller using the applicant's biometric sample and subsequently generates a unique public key and two sets of secret shares for the controller and optionally the custodian. After registration, the user can perform the signing process that generates a digital signature on an arbitrary message by presenting a biometric probe to match a biometric reference at a terminal. These processes utilize secure multi-party computation (MPC) such that the secret key—that is cryptographically associated with the generated public key—never appears at any of the participating entities, neither in memory nor in transit. If the user wishes to change their biometric reference, the user may undergo the biometric replacing process by providing a biometric probe to authenticate and a new biometric sample to replace the previous biometric reference. In case the user cannot provide a biometric probe, for example, due to injuries or medical conditions, the user may undergo the biometric re-binding process that replaces the biometric reference by, first, re-ascertaining the identity of the user with the custodian, and, second, providing a biometric sample of a different biometric characteristic. Both biometric replacing and biometric re-binding processes change the biometric reference without changing the user's public and secret keys.

During the registration process, the terminal takes the user's identification and biometric sample to compute a cancelable biometric template (CBT) and a set of parameters, called account parameters. The account parameters cannot be used to reverse, by any practical means, into the captured biometric sample. However, they are used with a biometric probe to retrieve the same CBT during subsequent processes. Using the CBT, the terminal then performs multi-party computation with the controller and the custodian, if required, to generate a public key and secret shares. The provided identification, the public key, and the account parameters constitute an account that identifies the user during subsequent interaction.

Once registered with the controller system, the user may digitally sign an arbitrary message by providing a matching biometric probe and the same identification to a terminal, which may or may not be the same as the terminal used during registration. The provided identification is sent to the controller so that it can return the registered account parameters. The biometric probe and the account parameters are then used by the terminal to retrieve the CBT and perform multi-party computation with the controller to produce a digital signature.

The biometric replacing process allows a user to replace a biometric reference, such as replacing one with a left-thumb fingerprint with another associated with a right-thumb fingerprint. This process requires the user to provide two samples of two different biometric characteristics: a biometric probe that matches the biometric reference and a new biometric sample. The terminal and the controller then perform a secure multi-party computation to calculate new secret shares for the controller and the custodian (if present). The terminal computes the new account parameters from the new biometric sample. After completing this process, the user's account is updated with the new account parameters, whereas the public key and the underlying secret key are unaffected.

In case the user has lost a means to provide a biometric probe of the same biometric characteristic as that of the biometric reference due to, for example, injuries or medical condition, the biometric re-binding process allows the user to re-bind a new biometric sample—of a different biometric characteristic altogether—to the user's existing account and the user's public-secret key pair. This process requires the participation of the custodian that holds a valid set of secret shares generated before. To initiate this process, the user must prove their identity to the custodian, the method by which is beyond the scope of this invention. Once the user's identity is verified, the user can provide a new biometric sample to a terminal, which then calculates a new CBT and a new set of account parameters. Using the new CBT, the terminal, the controller, and the custodian then perform the multi-party computation to generate new sets of secret shares while keeping the public key and the underlying secret key unaffected. The controller also updates the new account parameters to the user's account.

These processes are designed to keep biometric information and signed messages hidden from the controller and the custodian, protecting the users' personal information. However, there remains a shortcoming where each user account is associated with a unique set of account parameters and secret shares. This gives the controller the ability to keep records of each user's signing activities and, as a result, compromises their privacy. Hence, this invention also provides an alternative process that utilizes a method that retrieves account parameters in a privacy-preserving manner and eliminates the controller's ability to track signing activities. Using a privacy-preserving method, all aforementioned processes must also be modified such that a master secret share is used for many user accounts—ideally, all user accounts—to provide herd privacy.

FIG. 1 shows a high-level abstraction of the signing process in an example embodiment. The user provides necessary input 101 to the terminal. Two entities—the terminal and controller—participate in a protocol for two-party computation 102 (2PC) to produce the results of the signing process.

Figure 2:
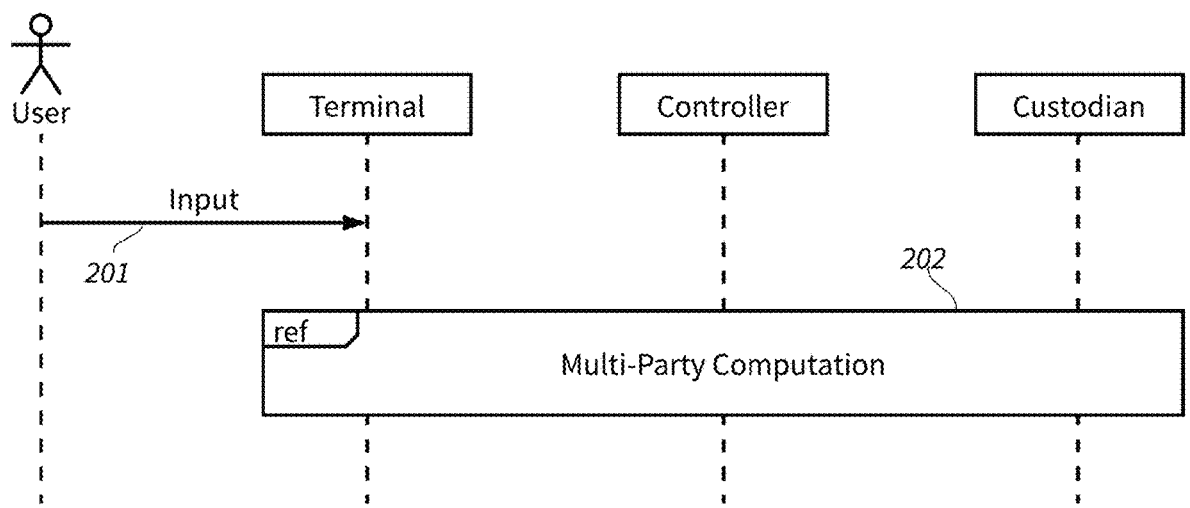
FIG. 2 is a sequence diagram illustrating the participation of a terminal—through which a user provides input—a controller, and a custodian in a multi-party computation protocol, according to an example embodiment.

FIG. 2 shows a high-level abstraction of the registration, biometric replacement, and biometric re-binding processes in an example embodiment. The user provides necessary input 201 to the terminal. Three entities—the terminal, controller, and custodian—participate in a protocol for multi-party computation 102 to produce the results of the respective processes.

Figure 3:
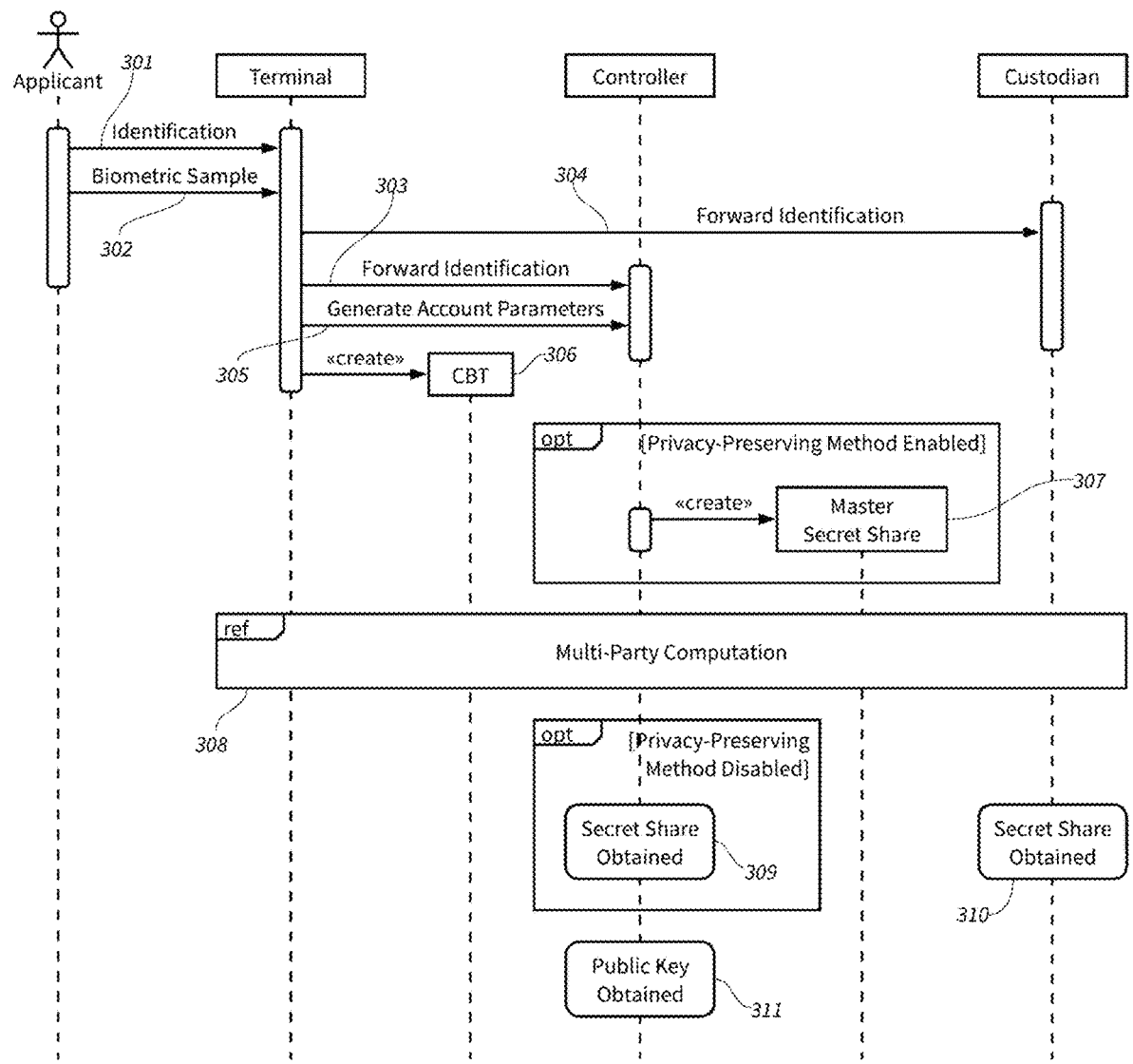
FIG. 3 is a sequence diagram illustrating a method of enrolling an applicant who provides their identification and biometric sample to a terminal, according to an example embodiment.

FIG. 3 shows FIG. 2 in detail for the registration process. If a privacy-preserving method, such as a private information retrieval (PIR) protocol, is enabled, the controller provides a master secret share that is common to many, if not all, users as an input to multi-party computation. Otherwise, the controller samples a different set of secret shares for each user. The custodian updates its set of secret shares from the output computed from the multi-party computation.

First, the user—an applicant—registers throughs a terminal by providing relevant identification 301 and a biometric sample 302. The terminal then sends the user identification and account parameters to the controller, as indicated by the message 303, and sends the user identification to the custodian, as indicated by the message 304. The inputs are used to generate account parameters 305 that are attributed to the applicant and a cancelable biometric template (CBT) 306. Subsequently, all participating parties perform the multi-party computation 308 that takes CBT from the terminal and outputs two secret shares that are associated with the applicant, one for the controller (whose share is indicated by the object 309) and one for the custodian (whose share is indicated by the object 310), as well as generating a public key obtained 311 by the controller. If a privacy-preserving method is enabled, the controller provides a master secret share 307 that is common to multiple users, if not all, and only one secret share for the custodian is generated.

Figure 4:
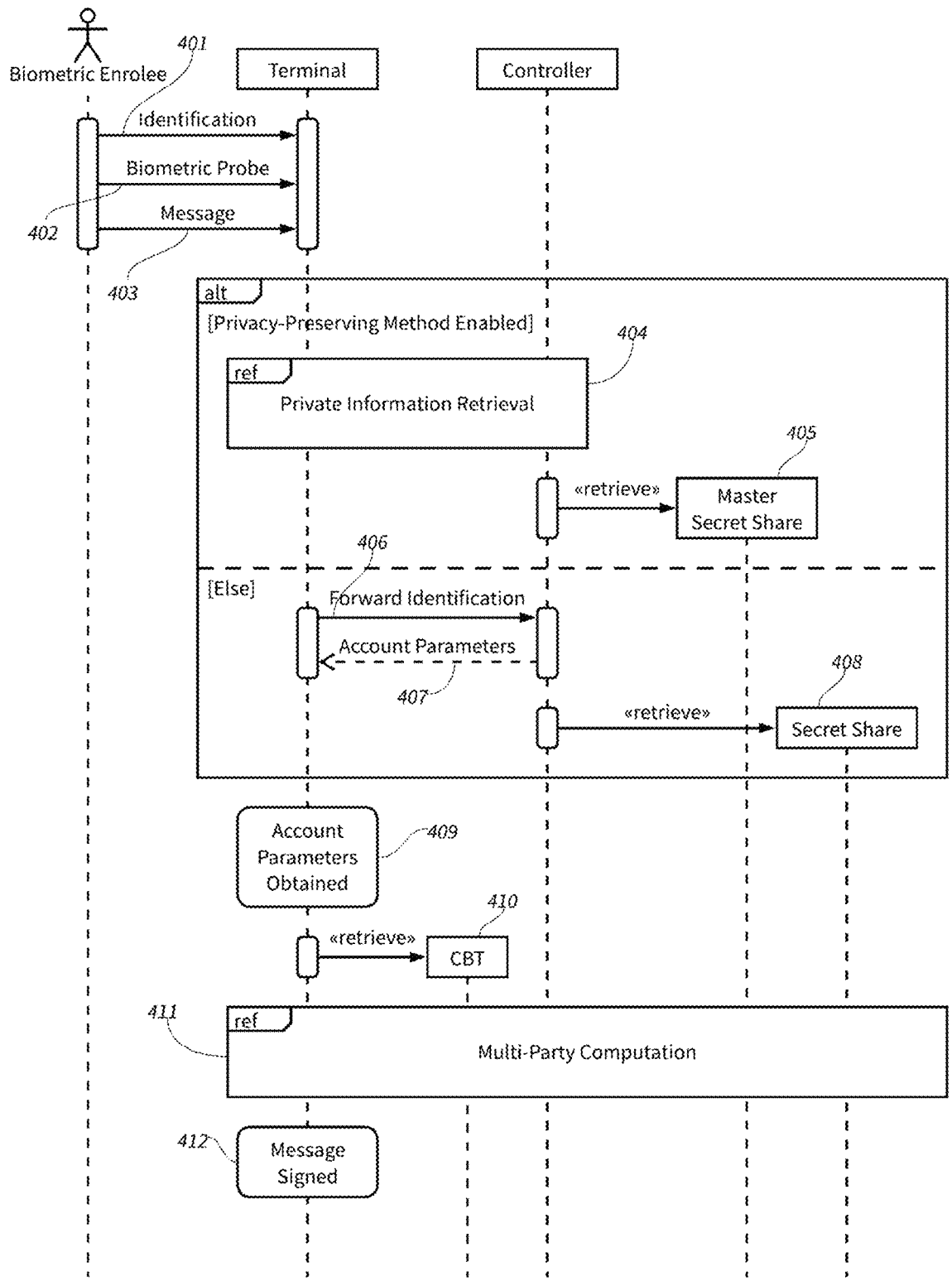
FIG. 4 is a sequence diagram illustrating a method of signing an electronic message by a biometric enrollee who provides their identification, biometric probe, and message, according to an example embodiment.

FIG. 4 shows FIG. 1 in detail. The user—a biometric enrollee—initiates the signing process by providing the following information to the terminal: the user's identification (the provision of which is indicated by the message 401), a biometric probe (the provision of which is indicated by the message 402) to match any biometric reference created after registration, and a message 403 to be signed, if any. The terminal may not be the same terminal as the one used during registration. The terminal then requests the user's account parameters from the controller, as indicated by the message 407 and the object 409, by providing identification, as indicated by the message 406. If a method for privacy-preserving retrieval 404 is enabled, account parameters are retrieved while leaving the controller no information about which user account has been queried. The terminal then uses the biometric probe and the account parameters to reproduce the CBT 410. The terminal and the controller perform multi-party computation 411 where the terminal uses the CBT and the message as input, whereas the controller uses either the master secret share 405 or the secret share 408 that is associated with the user's account as input. The 2PC calculation between the terminal and the controller outputs the signed message 412.

By undergoing the biometric replacement or biometric re-binding processes, a biometric enrollee, who has registered with the controller, may change their biometric reference while retaining the same account, public key, and underlying secret key. Both processes require the user to provide a new biometric sample. The biometric replacement process requires a biometric probe to match the existing biometric reference, whereas the biometric re-binding process does not, but instead requires the user to perform identity proofing with the custodian.

Figure 5:
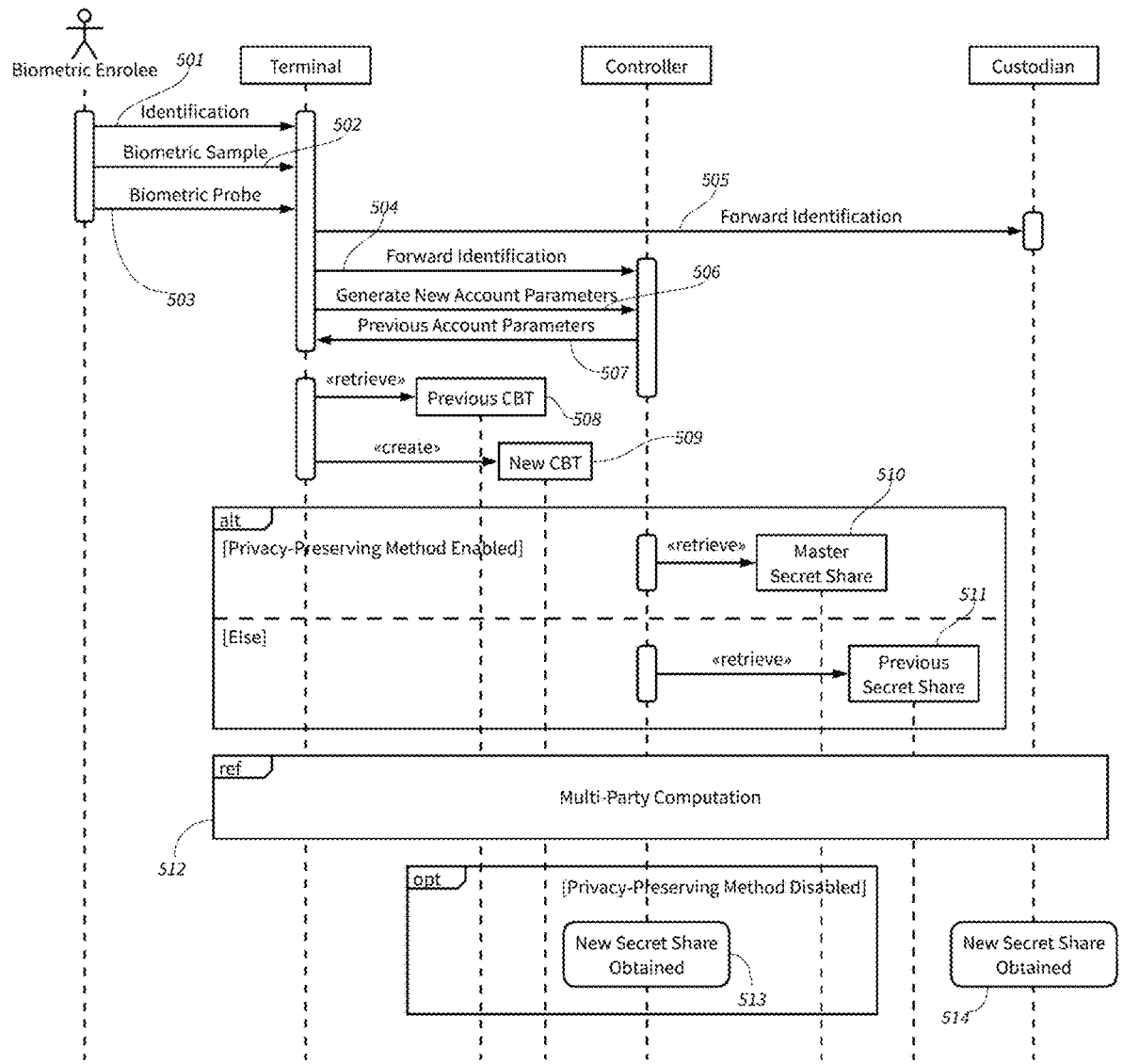
FIG. 5 is a sequence diagram illustrating a method whereby a biometric enrollee replaces their biometric reference with another created from either a new biometric sample of the same biometric characteristic or a biometric sample of a different biometric characteristic, according to an example embodiment.

FIG. 5 shows FIG. 2 in detail for the biometric replacement process. The user provides identification 501, a biometric probe 503, and a biometric sample 502 (a new one) to the terminal. The new biometric sample is used to compute a new CBT 509 and new account parameters. The terminal sends the new account parameters, as indicated by the message 506, along with the user identification, as indicated by the message 504, to update the user's account on the controller 506. If the custodian is present, the terminal also sends the identification to the custodian 505. The controller returns the previous account parameters 507 to the terminal. The terminal uses the previous account parameters and the biometric probe to compute the previous CBT 508. The terminal, the controller, and the custodian perform multi-party computation 512. The terminal uses the previous CBT and the new CBT as input 505, whereas the controller uses either the master secret share 510 or the previous secret share 511 that is associated with the user's account as input. The multi-party computation process computes new secret shares for the controller (whose share is indicated by the object 513) and the custodian (whose share is indicated by the object 514) if present, as output. If a privacy-preserving method is enabled, the multi-party computation does not generate a secret share for the controller.

Figure 6:
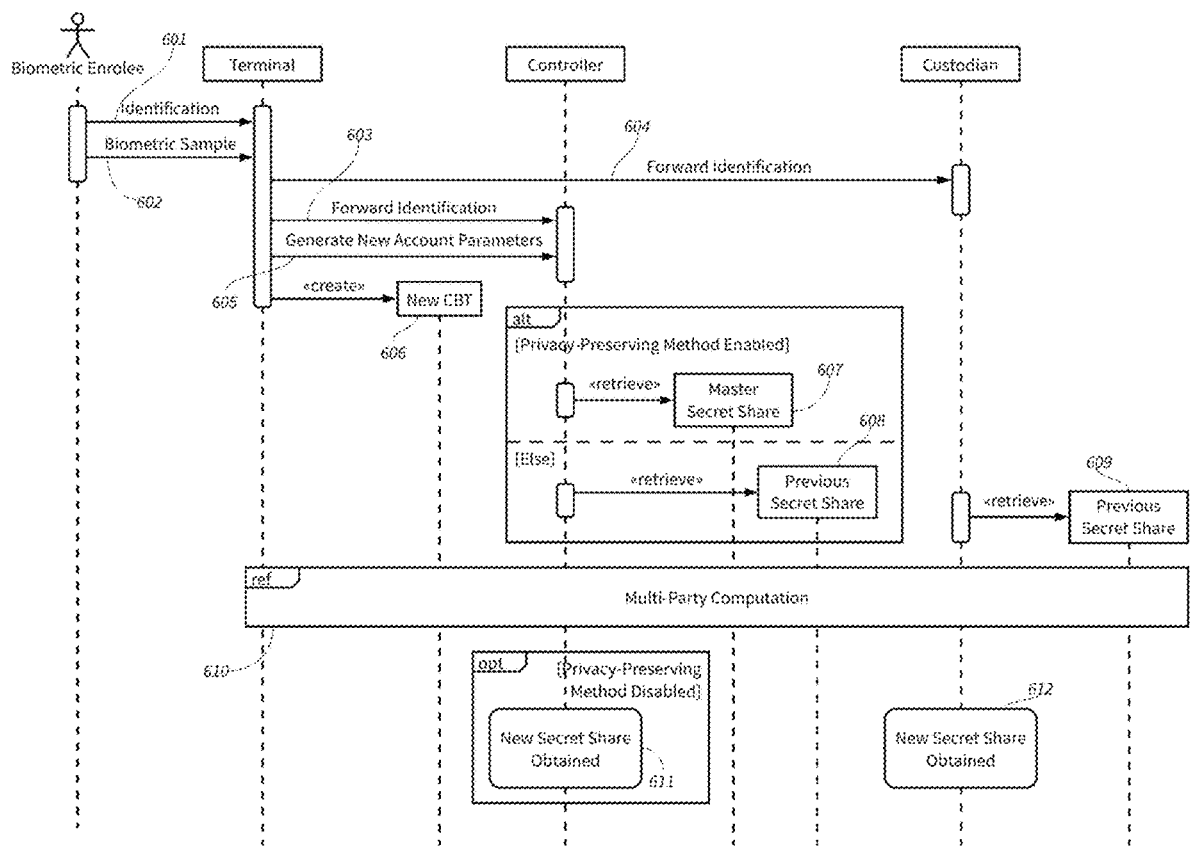
FIG. 6 is a sequence diagram illustrating a method whereby a biometric enrollee replaces their biometric reference with another created from a biometric sample of a different biometric characteristic without presenting a biometric probe, according to an example embodiment.

FIG. 6 shows FIG. 2 in detail for the biometric re-binding process. This process is taken if the user becomes unable to provide a biometric probe to match the biometric reference. This process requires the active participation of the custodian, which prevents the controller from having full authority to remove the old biometric reference and re-bind the new biometric reference to the user's account. The user provides identification 601 and a biometric sample 602—of a biometric characteristic different from that of the previous biometric reference—to the terminal. The new biometric sample is used to compute a new CBT 606 and new account parameters. The terminal sends the new account parameters, as indicated by the message 605, along with the user identification, as indicated by the message 603, to update the user's account on the controller. The user provides identification, as indicated by the message 604, to the custodian as part of the identity proofing process that ascertains the identity of the user. The identity proofing process may contain online and offline components to reduce the risk of identity fraud. The terminal, the controller, and the custodian then perform multi-party computation. The terminal uses the new CBT as input, whereas the controller uses either the master secret share 607 or the previous secret share 608 that is associated with the user's account as input. The custodian uses the previous secret share 609 as input. The process for multi-party computation 610 computes new secret shares for the controller (whose share is indicated by the object 611) and the custodian (whose share is indicated by the object 612) if present, as output. If a privacy-preserving method is enabled, the multi-party computation does not generate secret shares for the controller.

What is claimed is:

1. A computer-implemented method for signing a digital signature over a message by an authenticating user through a portal at a terminal system, the method comprising:

under the control of said terminal system configured with executable instructions,
obtaining a biometric sample of said user;
obtaining information representative of a unique identifier of said user;
obtaining said message;
generating a set of account parameters from the biometric sample;
generating a cancelable biometric template from said biometric sample;
preventing other systems participating in a multi-party computation protocol to which said terminal system is a party from reading said biometric sample and said cancelable biometric template; and
informing said user of the result of said signing;

under the control of each of one or more controller systems configured with executable instructions,
storing a set of account parameters associated with said unique identifier;
storing a secret share associated with said unique identifier and said controller system;
storing a master secret share associated with all controller systems;

under the control of said terminal system and said controller systems,
performing retrieval of said set of account parameters;
signing said message by means of a multi-party computation protocol that uses said set of account parameters, said cancelable biometric template, and zero or more of said secret shares; and
delivering the result of said signing to said terminal system;

under the control of each of one or more custodian systems configured with executable instructions,
storing a secret share associated with said unique identifier of the user and said custodian system;

under the control of said terminal system, said controller systems, and said custodian systems,
generating a set of at most as many secret shares as there are controller systems and custodian systems by means of a multi-party computation protocol that uses said cancelable biometric template.

2. The method of claim 1, further comprising:
under the control of each of said controller systems,
replacing an older set of account parameters in possession with a newer set of account parameters;
under the control of each of said controller systems and said custodian systems,
replacing an older secret share in possession with a newer secret share.

3. The method of claim 2, wherein the retrieval of the set of account parameters is by means of a cryptographic-based privacy-preserving method to which said terminal system and the controller systems are parties.

4. The method of claim 2, wherein the retrieval of the set of account parameters is by means of a privacy-preserving method to which the terminal system and said controller systems are parties, and the multi-party computation protocol also uses the master secret share.

5. The method of claim 1, wherein the retrieval of the set of account parameters is by means of a cryptographic-based privacy-preserving method to which said terminal system and the controller systems are parties.

* * * * *